United States Patent
Meyer

(10) Patent No.: US 6,218,862 B1
(45) Date of Patent: Apr. 17, 2001

(54) TWO-WAY TRANSMISSION DEVICE

(75) Inventor: Jacques Meyer, St. Martin de Vinoux (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/247,610

(22) Filed: Feb. 10, 1999

(30) Foreign Application Priority Data

Feb. 10, 1998 (FR) .................................................. 98 101559

(51) Int. Cl.$^7$ ............................................. H03K 19/0175

(52) U.S. Cl. .................................. 326/86; 326/82; 326/83

(58) Field of Search ................................. 326/80, 81, 82, 326/83, 86

(56) References Cited

U.S. PATENT DOCUMENTS

| | | | |
|---|---|---|---|
| 4,982,115 | * | 1/1991 | Lee ........................................ 307/475 |
| 5,202,593 | | 4/1993 | Huang et al. . |
| 5,225,722 | * | 7/1993 | Gotou et al. ......................... 307/475 |
| 5,440,182 | | 8/1995 | Dobbelaere . |
| 5,689,196 | | 11/1997 | Schutte . |
| 5,923,187 | * | 7/1999 | Maugars .................................. 326/86 |

OTHER PUBLICATIONS

French Search Report with Annex (Nov. 17, 1998).

* cited by examiner

*Primary Examiner*—Michael Tokar
*Assistant Examiner*—Anh Tran
(74) *Attorney, Agent, or Firm*—Theodore E. Galanthay; Stephen C. Bongini; Fleit, Kain, Gibbons, Gutman & Bongini P.L.

(57) ABSTRACT

A device for two-way digital transmission on a bus having at least one two-way line. The device includes a first pulling device for pulling a first section of the line to a first logic level, a second pulling device for pulling a second section of the line to the first logic level, and at least one two-way repeater that is connected between the first section and the second section. The repeater includes a third pulling device for pulling the first section of the line to a second logic level, a fourth pulling device for pulling the second section of the line to the second logic level, and a logic circuit that prevents the third and fourth pulling devices from being simultaneously active. In one preferred embodiment, at least one electronic circuit is connected to the first section of the line and at least one other electronic circuit is connected to the second section of the line. In another preferred embodiment, the repeater also includes a conditional circuit that is controlled by an electronic circuits connected to the first section. The conditional circuit selectively enables or prevents transmission between the first and second sections of the line.

23 Claims, 2 Drawing Sheets

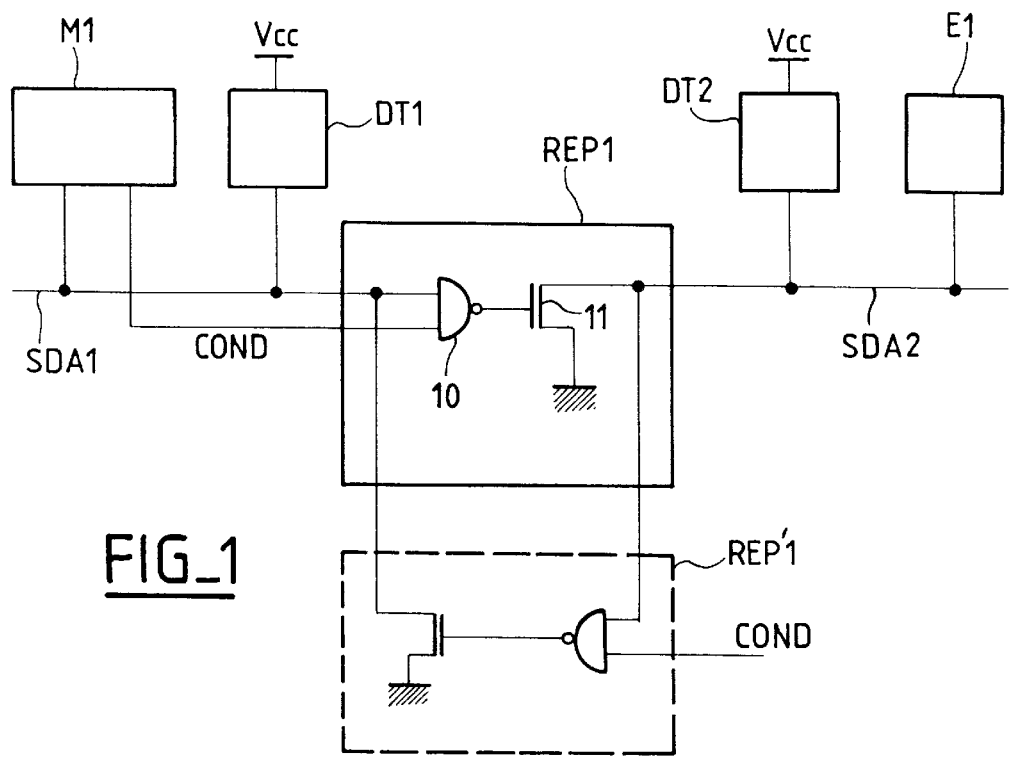
FIG_1
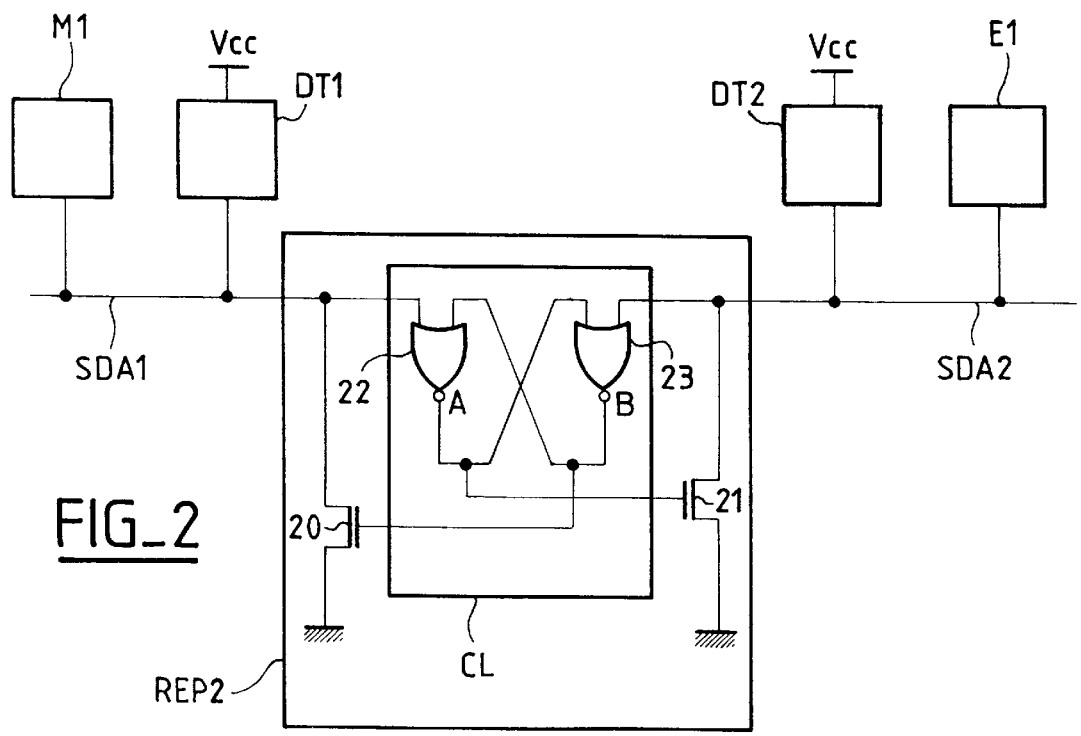
FIG_2

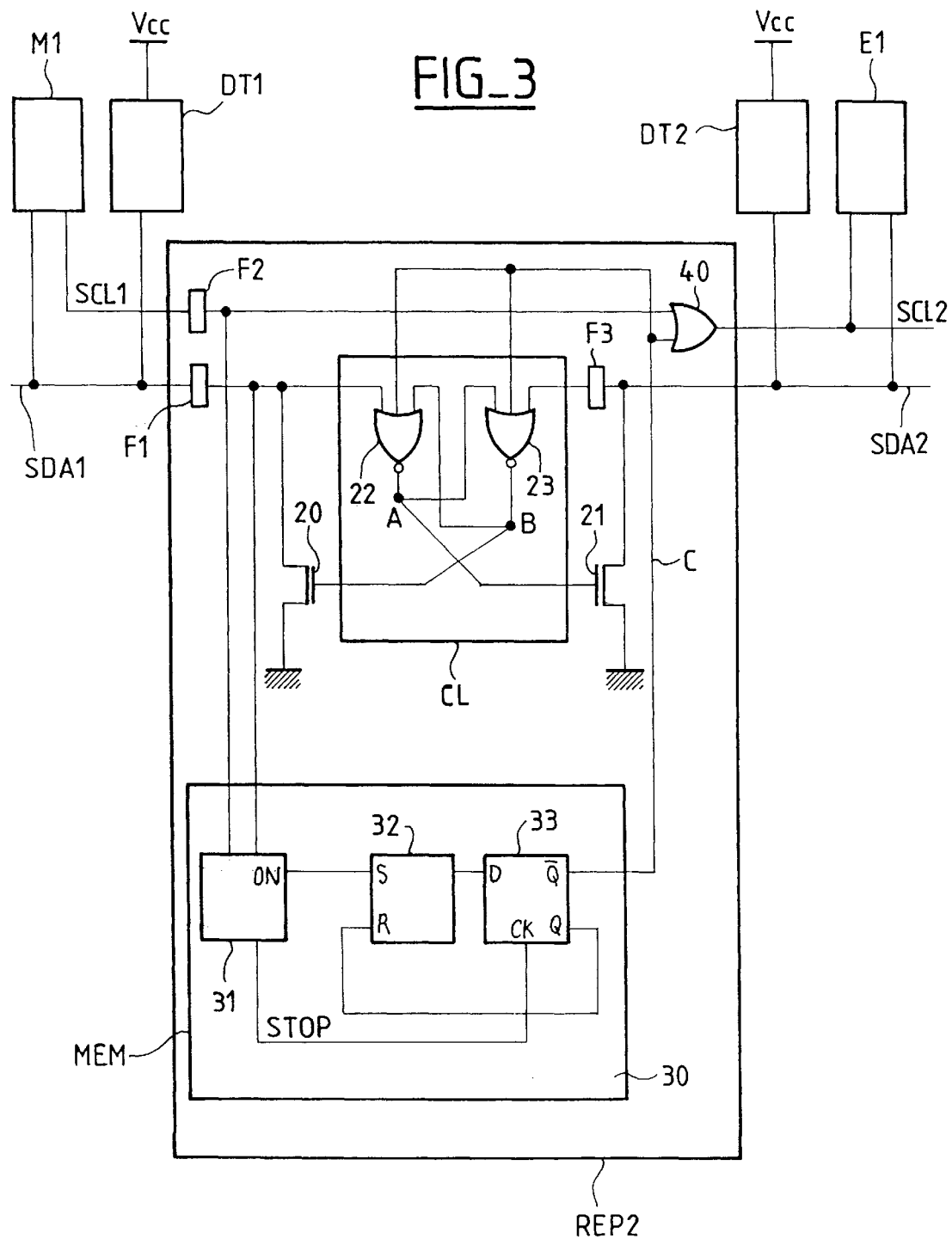
FIG_3

TWO-WAY TRANSMISSION DEVICE

CROSS-REFERENCE TO RELATED APPLICATIONS

This application is based upon and claims priority from prior French Patent Application No. 98-01559, filed Feb. 10, 1998, the entire disclosure of which is herein incorporated by reference.

BACKGROUND OF THE INVENTION

1. Field of the Invention

The present invention relates to devices for transmitting digital data, and more specifically to transmission of digital information on a two-way conductor.

2. Description of Related Art

There are several conventional two-way transmission busses that use one or more two-way conductors for transmitting digital data. For example, the I2C bus devised by Philips is commonly used in audio and video applications. The I2C bus has one-way supply lines in the form of a supply line for the positive supply voltage (e.g., 5 volts) and a supply line for ground. Additionally, the I2C bus has a clock line for transmitting a clock signal that can be a one-way signal or a two-way signal (e.g., when there are several master units on the bus), and a two-way data line for the digital data to be transmitted. When data is not being transmitted, the data line is pulled to a positive potential by a pulling device consisting of a resistor. To transmit on the two-way data line, a master or slave circuit takes over the data line and imposes negative pulses corresponding to the sequence of 1's and 0's of the information to be transmitted (i.e., addresses and data) at the clock rate in accordance with a specified protocol.

When making an electronic system for an application, the various electronic circuits required for the different functions of the system are chosen from the catalogs of suppliers of electronic circuits. Depending on the functions being sought (e.g., depending on if what is being sought is a microprocessor, an audio amplifier or tuner, a static or dynamic memory, and/or a non-volatile or other type of memory), the technologies of the electronic circuits that are available are not always equivalent. For example, there is a current trend towards the development of technologies and circuit structures capable of operating at low supply voltages (e.g., 2.5 volts or less). However, while microprocessors and memories that operate at 2.5 volts are currently available, other electronic circuits that require a great deal of power (e.g., tuners) are currently only available for operation at 5 volts. If it is desired to use circuits operating at different voltages in the same electronic system, it is necessary to provide for the matching of the levels of the data to be transmitted.

Furthermore, certain electronic circuits (e.g., amplifiers) are highly sensitive to noise. In a system having many electronic circuits that communicate through the same transmission bus, a sensitive circuit (such as the tuner) can be significantly disturbed by all of the information transmitted on the bus that is intended for other circuits.

SUMMARY OF THE INVENTION

In view of these drawbacks, it is an object of the present invention to remove the above-mentioned drawbacks and to allow circuits that operate at different voltages to be connected to the same two-way transmission bus. A circuit that requires a different supply voltage or that is to be isolated is connected to a two-way line through a two-way repeater. By achieving a matching of levels in both directions, the repeater allows circuits that operate at different supply voltages to be connected to the same two-way bus. Further, the repeater makes it possible to provide different pulling devices on each side of the repeater. Thus, the pulling devices can be matched with the line impedances on each side of the repeater.

Another object of the present invention is to limit noise on a two-way transmission bus. The repeater isolates the circuit by not allowing the circuit to receive any piece of information that is not intended for the circuit. Preferably, the repeater allows the circuit to be actively connected to the bus only when the information on the bus is intended for the circuit and/or when the circuit itself is transmitting information on the bus.

One embodiment of the present invention provides a device for two-way digital transmission on a bus having at least one two-way line. The device includes at least one two-way repeater that is connected between a first section and a second section of the two-way line, and each line section is connected to at least one electronic circuit. First and second pulling devices, which pull to a first logic level, are connected to the first and second line sections, respectively. Further, the repeater includes third and fourth pulling devices, which pull to a second logic level, that are connected to the first and second line sections, respectively. A logic circuit connected to the first and second line sections controls the third and fourth pulling devices so that the third and fourth pulling devices are not simultaneously active.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 is a block diagram showing an embodiment of a repeater that is not suited to two-way transmission;

FIG. 2 is a block diagram showing a two-way repeater according to one embodiment of the present invention; and FIG. 3 is a block diagram showing a two-way repeater that includes isolation control circuitry in accordance with another embodiment of the present invention.

DETAILED DESCRIPTION OF PREFERRED EMBODIMENTS

Preferred embodiments of the present invention will be described in detail hereinbelow with reference to the attached drawings. While the following description illustratively uses positive logic (i.e., a positive high level corresponds to a high logic level and ground corresponds to a low logic level), the present invention is not limited to such embodiments. For example, the embodiments described below could easily be adapted by one of ordinary skill in the art for a system using negative logic or some other logic scheme.

FIG. 1 shows a conditional one-way repeater. The repeater REP1 is placed on a two-way line so as to separate the line into two sections SDA1 and SDA2. A pulling device is provided for each of the line sections, with one pulling device DT1 being connected to the first section SDA1 and another pulling device DT2 being connected to the second section SDA2. The repeater REP1 is placed between the two pulling devices DT1 and DT2. A one-way repeater is a simple logic gate interface and is not particularly complicated. The one-way repeater REP1 shown in FIG. 1 includes a NAND gate 10 that receives the end of the first line section SDA1 at one input and a conditional signal COND at another input. The output of the NAND gate is supplied to the gate (or base) of a transistor 11 that is connected between the end of the second line section SDA2 and ground.

Additionally, the first line section SDA1 is connected to one or more electronic circuits such as a master circuit (e.g., processor) M1, and the second line section SDA2 is connected to one or more other electronic circuits such as a slave circuit (e.g., memory or tuner) E1. The master circuit M1 provides the conditional signal COND to the NAND gate 10 to enable messages addressed to the slave circuit E1 to be transmitted to the slave circuit on the initiative of the sender (i.e., master circuit). More specifically, if the conditional signal COND is active, the repeater retransmits the information on the first line section by having the transistor 11 pull the second line section SDA2 to ground when the first line section SDA1 is at ground, and by allowing the pulling device DT2 to dictate the potential of the second line section SDA2 when the first line section SDA1 is not at ground.

While such a simple device can operate as a one-way repeater, it cannot be used in a two-way mode. Further, a two-way repeater cannot be formed by simply adding a second reversed one-way repeater REP'1 for transmitting in the opposite direction, as shown in dashes in FIG. 1. With this arrangement, if one circuit dictates a zero (i.e., ground) on the first line section SDA1, the second line section SDA2 is pulled to ground through the operation of the first repeater REP1. At the same time, the second repeater REP'1 operates in the same manner to keep the first line section SDA1 at ground. Thus, both line sections are locked at zero and further information cannot be transmitted. For a repeater to operate properly in the two-way mode, one line section must be capable of returning to the high (i.e., resting) state and then subsequently returning the other section to the high state.

A two-way repeater according to one embodiment of the present invention is shown in FIG. 2. The repeater REP2 has a zero pulling device connected to each of the line sections SDA1 and SDA2. In the illustrated example, a first transistor 20 is connected between the first line section SDA1 and ground and a second transistor 21 is connected between the second line section SDA2 and ground. Additionally, the repeater REP2 includes a logic circuit CL that controls the zero pulling devices such that the two zero pulling devices are not simultaneously active.

In the embodiment of FIG. 1, the logic circuit CL includes a first NOR gate 22 that receives the first line section SDA1 at one input and a second NOR gate 23 that receives the second line section SDA2 at one input. The other input of the first NOR gate 22 receives the output B of the second NOR gate 23, and the other input of the second NOR gate 23 receives the output A of the first NOR gate 22. Further, the output A of the first NOR gate 22 is supplied to the control electrode (i.e., gate or base depending on transistor type) of the second transistor 21 that pulls the second line section SDA2 to zero, and the output B of the second NOR gate 23 is supplied to the control electrode of the first transistor 20 that pulls the first line section SDA1 to zero.

The operation of the two-way repeater of FIG. 2 will now described in detail. When no information is transmitted to the conductor SDA (i.e., at rest), each of the two line sections SDA1 and SDA2 is pulled to its high resting level by the corresponding pulling device DT1 or DT2. Therefore, the outputs A and B of the two NOR gates are both at zero. Then, as soon as one of the line sections is pulled to zero by a connected electronic circuit, the outputs A and B of the two NOR gates become complementary to one another and the other line section is pulled to zero. For example, if the first line section SDA1 goes to zero, the output A of the first NOR gate goes high and makes the second transistor 21 conductive. Therefore, the second transistor 21 pulls the second line section SDA2 to zero.

However, because the high level output A of the first NOR gate 22 is supplied to one input of the second NOR gate 23, the output B of the second NOR gate remains unchanged at zero regardless of the level of the second line section SDA2. Thus, the first transistor 20 remains off (i.e., not conductive) and there is no looping to the first line section SDA1. Later, when the first line section SDA1 returns to the high resting state because of the absence of a command on the section, the second line section SDA2 also goes back to the high level. In other words, there is a proper return to the initial high resting level. While the embodiment of FIG. 1 uses single MOS transistors as the zero pulling devices of the repeater, in further embodiments single bipolar transistors, open drain inverters (MOS technology), open collector inverters (bipolar technology), or the like are used.

With the two-way repeater according to the present invention, electronic circuits that operate at a first supply voltage (e.g., 2.5 volts) can be connected to one line section and other electronic circuits that operate at a different supply voltage (e.g., 5 volts) can be connected to the other line section. In such a case, the high level pulling devices are different, with one device pulling the one line section to the first supply voltage level and another device pulling the other line section to the different supply voltage level. Thus, it is possible to use electronic circuits from differing technologies in the same application without having level problems when transmitting information between the different types of circuits. All that is required is that the circuits are combined in two sets. That is, a first set of the circuits that operate at a first supply voltage is connected to one line section, a second set of the circuits that operate at a second supply voltage is connected to another line section, and a two-way repeater according to the present invention is placed between the two line sections.

Furthermore, the two zero pulling devices of the repeater may be different (e.g., sized differently) so as to match each pulling device with the impedance of the associated section. For example, if a line section is weakly capacitive, a low resistance pulling device that is sufficient to pull the section to zero in an appropriate response time can be used. On the other hand, for a highly capacitive line section, a large transistor that can draw a great deal of current can be matched with the associated section. Thus, by suitably sizing the zero pulling devices, an optimum level of current consumption (i.e., the lowest possible level) can be obtained without penalizing the response time.

FIG. 3 shows a two-way repeater according to another embodiment of the present invention. As shown, the repeater REP2 has an added conditional circuit 30 that allows the two line sections to be actively connected or isolated from one another. Such a "conditional repeater" can be used to isolate one electronic circuit from the rest of the system. (While it is of course also technically possible to have multiple electronic circuits that are isolated, in practical applications only one circuit is to be isolated from the others.) The electronic circuit to be isolated is connected to one line section, and the other electronic circuits in the system are connected to another line section.

In the exemplary embodiment of FIG. 3, the electronic circuit to be isolated is a slave circuit E1 connected to the second line section SDA2, and the conditional circuit 30 is controlled by an electronic circuit (i.e., master circuit M1) connected to the first line section SDA1. The conditional circuit 30 of the repeater includes a storage element MEM for a conditional signal C that is supplied to the logic circuit CL to control whether or not the logic circuit takes account of the levels on the line sections. In the illustrated embodiment, the conditional signal is supplied to a third input of each of the NOR gates 22 and 23.

Therefore, when the conditional signal C is at the high level, the outputs A and B of the NOR gates are set to zero so transmission between the two line sections is not possible. On the contrary, when the conditional signal C is at zero, two-way transmission of information between the two line sections is enabled. Preferably, the conditional signal C defaults to the high level to isolate the slave circuit E1 and an activation command is needed to enable two-way transmission through the repeater. In some embodiments, the conditional circuit 30 is directly controlled by the electronic circuit that is the master of the first line section SDA1 as in the case in FIG. 1.

However, in preferred embodiments, the conditional circuit 30 is advantageously controlled by the first line section SDA1 so that transmission can be activated without distinction by the electronic circuits connected to the first line section SDA1. In one such embodiment, the conditional circuit 30 includes an activation detector circuit 31 that receives the first line section SDA1, as shown in FIG. 3. The detector circuit 31 recognizes an activation message or an end message and permits or prohibits two-way transmission through the repeater by setting the storage element MEM to the high level or ground. In FIG. 3, a clock signal transmission line is also shown. In the embodiment of FIG. 3, the clock signal line is a one-way line SCL1 for a clock signal generated by the master circuit M1 that is connected to the first line section SDA1.

The clock signal line SCL1 is connected to the conditional circuit 30, and more specifically to the activation detector circuit 31, to enable the decoding of activation and end messages. The storage element MEM of the conditional circuit 30 illustratively includes an RS-type flip-flop 32 and a D-type (latch) flip-flop 33 that are both controlled by the activation detector circuit 31. The output Q of the RS flip-flop 32 is supplied to the input D of the D flip-flop 33, and the output Q of the D flip-flop 33 is looped back to the zero-setting input R of the RS flip-flop 32. The inverted output /Q of the D flip-flop 33 provides the conditional signal C that controls the isolation or active connection of the repeater. Additionally, an output STOP of the detector circuit 31 is supplied to the clock input CK of the D flip-flop 33.

The operation of the repeater of FIG. 3 will now be explained. When the detector circuit 31 detects an activation message from a master on the first line section SDA1, a positive pulse is output to the one-setting input S of the RS flip-flop 32 and a clock pulse STOP is generated to cause the high level output of the RS flip-flop to be stored in the D flip-flop 33. Thus, the inverted output /Q of the D flip-flop goes to zero and operation of the two-way repeater is enabled. At the same time, the output Q of the D flip-flop goes to the high level so the RS flip-flop is reset to zero.

Then, when the detector circuit 31 detects an end message, a new clock pulse STOP is generated to cause the D flip-flop to store the zero level output of the RS flip-flop. Therefore, the inverted output /Q of the D flip-flop, and thus the conditional signal C, returns to the high level to deactivate the repeater.

In practice, the activation message can be generated by having a master on the first line section SDA1 send out the address of the repeater, and the deactivation message can be the end of the response message from the slave circuit E1. Because in such embodiments the detector circuit 31 is a simple decoder of an address and an end message, there is no need to know the transmission protocol. Thus, a particularly simple and low-cost embodiment of the conditional two-way repeater of the present invention is provided.

Further, it is preferable to provide the repeater with an isolation gate 40 that selectively prevents the clock signal on the one-way clock line SCL1 from being transmitted to the slave circuit E1. In the embodiment of FIG. 3, such isolation is performed by a third NOR gate 40 that receives the line SCL1 and the conditional signal C. The output of the third NOR gate 40 is supplied to another clock line SCL2 that is connected to the clock input of the slave circuit E1. In selected embodiments, the noise insulation is further improved by placing filters F1, F2, and F3 at the inputs for the first line section (F1), the clock signal (F2), and the second line section (F3). However, such filters are not required for the operation of the repeater and thus are not included if doing so would excessively impact the transmission time, especially since the repeater itself already slows data transmission.

In one practical system in which the slave circuit is a tuner, the conditional two-way repeater of the present invention allows the tuner to be efficiently protected from transmission noise on the data and clock lines, and at the same time allows the tuner to receive a different supply voltage than the rest of the electronic circuits in the system.

In a specific system, one repeater can be provided between two sets of circuits that operate at different supply voltages. It is also possible according to the present invention to provide multiple conditional repeaters, with each conditional repeater allowing an associated electronic circuit to be isolated in the system.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A device for two-way digital transmission on a bus having at least one two-way line, said device comprising:
    a first pulling device, which pulls to a first logic level, connected to a first section of the line;
    a second pulling device, which pulls to the first logic level, connected to a second section of the line; and
    at least one two-way repeater connected between the first section and the second section, the repeater including:

a third pulling device, which pulls to a second logic level, connected to the first section;

a fourth pulling device, which pulls to the second logic level, connected to the second section;

a logic circuit connected to the first section and the second section, the logic circuit automatically preventing the third pulling device from being active whenever the fourth pulling device is active and automatically preventing the fourth pulling device from being active whenever the third pulling device is active, the logic circuit receiving a conditional signal; and a conditional circuit generating the conditional signal in order to selectively isolate the first and second sections of the line so that transmission between the first and second sections is not possible regardless of the levels on the first and second sections, the conditional circuit being controlled by an electronic circuit that is connected to the first section.

2. The device as defined in claim 1, wherein the logic circuit includes:

a first NOR gate having a first input connected to the first section of the line, a second input, and a third input receiving the conditional signal; and a second NOR gate having a first input connected to the second section of the line, a second input and a third input receiving the conditional signal, wherein the output of the first NOR gate is supplied to the second input of the second NOR gate and controls the fourth pulling device, and the output of the second NOR gate is supplied to the second input of the first NOR gate and controls the third pulling device.

3. The device as defined in claim 1, wherein the first pulling device imposes a first voltage level on the first section of the line, and the second pulling device imposes a second voltage level, which is different from the first voltage level, on the second section of the line.

4. The device as defined in claim 1, wherein the third pulling device is sized as a function of the impedance of the first section of the line, and the fourth pulling device is sized as a function of the impedance of the second section of the line.

5. The device as defined in claim 1, wherein the first section is connected to at least one electronic circuit and the second section is connected to at least one other electronic circuit.

6. The device as defined in claim 1, wherein the conditional circuit includes a storage element for storing the conditional signal.

7. A device for two-way digital transmission on a bus having at least one two-way line, said device comprising:

a first pulling device, which pulls to a first logic level, connected to a first section of the line;

a second pulling device, which pulls to the first logic level, connected to the second section of the line; and at least one two-way repeater connected between the first section and the second section, the repeater including:

a third pulling device, which pulls to a second logic level, connected to the first section;

a fourth pulling device, which pulls to the second logic level, connected to the second section;

a logic circuit connected to the first section and the second section, the logic circuit receiving a conditional signal; and a conditional circuit generating the conditional signal to selectively enable or prevent transmission between the first and second sections, the conditional circuit being controlled by an electronic circuit that is connected to the first section, wherein the bus also includes a clock signal line for transmitting a clock signal, and the conditional signal is applied to an isolating logic gate that also receives the clock signal, the isolating logic gate enabling or preventing transmission of the clock signal to at least one other electronic circuit connected to the second section.

8. The device as defined in claim 1, wherein the conditional circuit includes a detector circuit that is connected to the first section, the detector circuit detecting an activation or isolation message.

9. A two-way repeater for use with a bus having at least one two-way line, said repeater comprising:

a first pulling device connected to a first section of the line, the first pulling device selectively pulling the first section to a predetermined logic level;

a second pulling device connected to a second section of the line, the second pulling device selectively pulling the second section to the predetermined logic level;

control logic connected to the first and second sections of the line, the control logic receiving a conditional signal; and a conditional circuit generating the conditional signal in order to selectively isolate the first and second sections of the line so that transmission between the first and second sections is not possible regardless of the levels on the first and second sections, wherein the first section of the line is not directly connected to the second section of the line, and the control logic automatically prevents the first pulling device from being active whenever the second pulling device is active, and automatically prevents the second pulling device from being active whenever the first pulling device is active.

10. The repeater as defined in claim 9, wherein the control logic includes:

a first NOR gate having an input connected to the first section and an output that controls the second pulling device; and a second NOR gate having an input connected to the second section and an output that controls the first pulling device, wherein the conditional signal is directly supplied to one input of the first NOR gate and one input of the second NOR gate.

11. The repeater as defined in claim 9, wherein the first pulling device includes a first transistor that is connected between the first section and a predetermined voltage, and the second pulling device includes a second transistor that is connected between the second section and the predetermined voltage.

12. The repeater as defined in claim 11, wherein the first transistor is sized as a function of the impedance of the first section of the line, and the second transistor is sized as a function of the impedance of the second section of the line.

13. The repeater as defined in claim 9, wherein the first pulling device includes an inverter that is connected to the first section and a predetermined voltage, and the second pulling device includes an inverter that is connected to the second section and the predetermined voltage.

14. The repeater as defined in claim 9, wherein the conditional circuit includes a detector that is connected to at least one of the first and second sections of the line, the detector detecting activation and deactivation signals on the section.

15. The repeater as defined in claim 14, wherein the conditional circuit further includes a storage element that stores the conditional signal based on the output of the detector, the conditional signal being supplied to the control logic to selectively disable both the first and second pulling devices.

16. A digital system comprising:
   a bus having at least one two-way transmission line, the line being divided into first and second sections that are not directly connected together;
   a first set of one or more electronic circuits, each of the electronic circuits being connected to the first section of the line;
   a second set of one or more other electronic circuits, each of the other electronic circuits being connected to the second section of the line; and
   a repeater connected between the first and second sections of the line, the repeater including:
      a first pulling device connected to the first section of the line for selectively pulling the first section to a first logic level;
      a second pulling device connected to the second section of the line for selectively pulling the second section to the first logic level; and
      control logic connected to the first and second sections of the line, the control logic automatically preventing the first pulling device from being active whenever the second pulling device is active and automatically preventing the second pulling device from being active whenever the first pulling device is active, the control logic receiving a conditional signal; and
      a conditional circuit generating the conditional signal in order to selectively isolate the first and second sections of the line so that transmission between the first and second sections is not possible regardless of the levels on the first and second sections, the conditional circuit being controlled by one of the electronic circuits connected to the first section.

17. The digital system as defined in claim 16, wherein each of the electronic circuits operates at a first supply voltage and each of the other electronic circuits operates at a second supply voltage, which is different from the first supply voltage.

18. The digital system as defined in claim 16, wherein the second set of other electronic circuits consists of one electronic circuit that is to be isolated from all other electronic circuits connected to the bus.

19. The digital system as defined in claim 16,
   wherein the line is further divided so as produce at least three sections of the line that include the first section, the second section, and other sections, and
   one of the repeaters is provided for connecting every two adjacent sections of the line.

20. The digital system as defined in claim 16, further comprising:
   a third pulling device connected to the first section of the line for pulling the first section to a second logic level; and
   a fourth pulling device connected to the second section of the line for pulling the second section to the second logic level.

21. The digital system as defined in claim 16, wherein the control circuit includes:
   a first NOR gate having an input connected to the first section, another input receiving the conditional signal, and an output that controls the second pulling device; and
   a second NOR gate having an input connected to the second section, another input receiving the conditional signal, and an output that controls the first pulling device.

22. The digital system as defined in claim 16,
   wherein the first pulling device includes a first transistor that is connected between the first section and a predetermined voltage, and
   the second pulling device includes a second transistor that is connected between the second section and the predetermined voltage.

23. A digital system comprising:
   a bus having at least one two-way transmission line, the line being divided into first and second sections that are not directly connected together;
   a first set of one or more electronic circuits, each of the electronic circuits being connected to the first section of the line;
   a second set of one or more other electronic circuits, each of the other electronic circuits being connected to the second section of the line; and
   a repeater connected between the first and second sections of the line, the repeater including:
      a first pulling device connected to the first section of the line for selectively pulling the first section to a first logic level;
      a second pulling device connected to the second section of the line for selectively pulling the second section to the first logic level;
      control logic connected to the first and second sections of the line, the control logic receiving a conditional signal; and
      a conditional circuit generating the conditional signal to selectively enable or prevent transmission between the first and second sections, the conditional circuit being controlled by one of the electronic circuits connected to the first section,
   wherein the bus also includes a clock signal line for transmitting a clock signal, and
   the conditional circuit also operates to enable or prevent transmission of the clock signal to the other electronic circuits.

* * * * *